United States Patent [19]

Dambach et al.

[11] Patent Number: 5,406,788

[45] Date of Patent: Apr. 18, 1995

[54] METHOD AND APPARATUS FOR MONITORING A SYSTEM FOR DELIVERING SECONDARY AIR TO THE EXHAUST GAS INTERNAL COMBUSTION ENGINE

[75] Inventors: Dieter-Andreas Dambach, Stuttgart; Rainer Frank, Sachsenheim; Manfred Mezger, Markgroeningen-Unterriex, all of Germany

[73] Assignee: Robert Bosch GmbH, Stuttgart, Germany

[21] Appl. No.: 127,033

[22] Filed: Sep. 24, 1993

[30] Foreign Application Priority Data

Nov. 4, 1992 [DE] Germany .................. 42 37 215.1

[51] Int. Cl.6 .............................................. F01N 3/20
[52] U.S. Cl. .................................. 60/276; 60/290; 60/304; 60/307
[58] Field of Search ............... 60/274, 276, 289, 290, 60/304, 307

[56] References Cited

U.S. PATENT DOCUMENTS

| | | | |
|---|---|---|---|
| 3,931,710 | 1/1976 | Hartel | 60/290 |
| 4,112,678 | 9/1978 | Miyagi | 60/289 |
| 4,154,057 | 5/1979 | Mitsuda | 60/290 |
| 4,175,386 | 11/1979 | Katahira | 60/289 |
| 4,200,071 | 4/1980 | Maurer | 60/289 |
| 4,269,028 | 5/1981 | Hattori | 60/289 |
| 4,276,745 | 7/1981 | Takada | 60/276 |
| 4,363,209 | 12/1982 | Atago | 60/289 |
| 4,699,176 | 10/1987 | Paddock | 60/289 |
| 5,068,575 | 11/1991 | Cook | 60/289 |
| 5,119,631 | 6/1992 | Kayanuma | 60/276 |

Primary Examiner—Ira S. Lazarus
Assistant Examiner—Daniel J. O'Connor
Attorney, Agent, or Firm—Edwin E. Greigg; Ronald E. Greigg

[57] ABSTRACT

An apparatus for monitoring a system for delivering secondary air to an exhaust tube of an internal combustion engine. In the method and apparatus, a secondary air pump is switched on and builds up a pressure on the inlet side of a blocking valve which is normally closed and not being acted upon. The blocking valve has a valve closing member that is acted upon by a predetermined closing force of an elastic element. If the secondary air quantity pumped by the secondary air pump reaches a certain minimum air quantity and pressure, then with the then-opened blocking valve, a lambda sensor disposed in an exhaust tube detects a change in the lambda value in the exhaust tube that exceeds a predetermined threshold value. The apparatus is suitable for monitoring the function of a system for delivering secondary air to the exhaust tube of an internal combustion engine.

5 Claims, 2 Drawing Sheets

METHOD AND APPARATUS FOR MONITORING A SYSTEM FOR DELIVERING SECONDARY AIR TO THE EXHAUST GAS INTERNAL COMBUSTION ENGINE

BACKGROUND OF THE INVENTION

The invention is based on an apparatus for monitoring a system for delivery of secondary air to the exhaust gas of an internal combustion engine. It has already been proposed (German Patent Application P 41 41 946.4, corresponding to U.S. patent application Ser. No. 07/993,004) to supply secondary air to the combustion products on the exhaust side, in order to reduce polluting exhaust components and to heat the catalytic converter. By way of example, such an apparatus includes a conduit system with a secondary air pump for pumping the secondary air flow and for building up a pumping pressure, a blocking valve for selectively switching the secondary air introduction on or off, and a check valve that prevents exhaust gas from reaching the blocking valve counter to the pumping direction of the secondary air pump. A control unit evaluates engine operating parameters, such as the lambda value, and controls the operation of the secondary air pump and the switching of the blocking valve.

If the function of such a system for delivering secondary air is to be monitored by components belonging to the system, then by way of example, with the blocking valve open and with the lambda control active, secondary air can be introduced into the engine exhaust line downstream of the lambda sensor, and the change in the lambda value can be utilized to evaluate the function. This procedure has the disadvantage, however, that during the monitoring process a relatively large quantity of secondary air is fed into the exhaust line, which causes a sharp change in the exhaust composition and hence worsens the conversion rate of the catalytic converter. Overheating of the catalytic converter can also occur.

OBJECT AND SUMMARY OF THE INVENTION

The apparatus according to the invention for monitoring a system for delivering secondary air to the exhaust gas of an internal combustion engine has the advantage over the prior art that blowing secondary air into the exhaust gas during the monitoring process is done only when the secondary air pressure is adequately high, and that then only a relatively small quantity of secondary air is delivered to the exhaust conduit, thereby avoiding any major change in the exhaust composition with the attendant worsening of the conversion rate and overheating of the catalytic converter.

The apparatus of the invention also have the advantage of not requiring any additional components, such as sensors, to monitor the system for blowing in secondary air.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
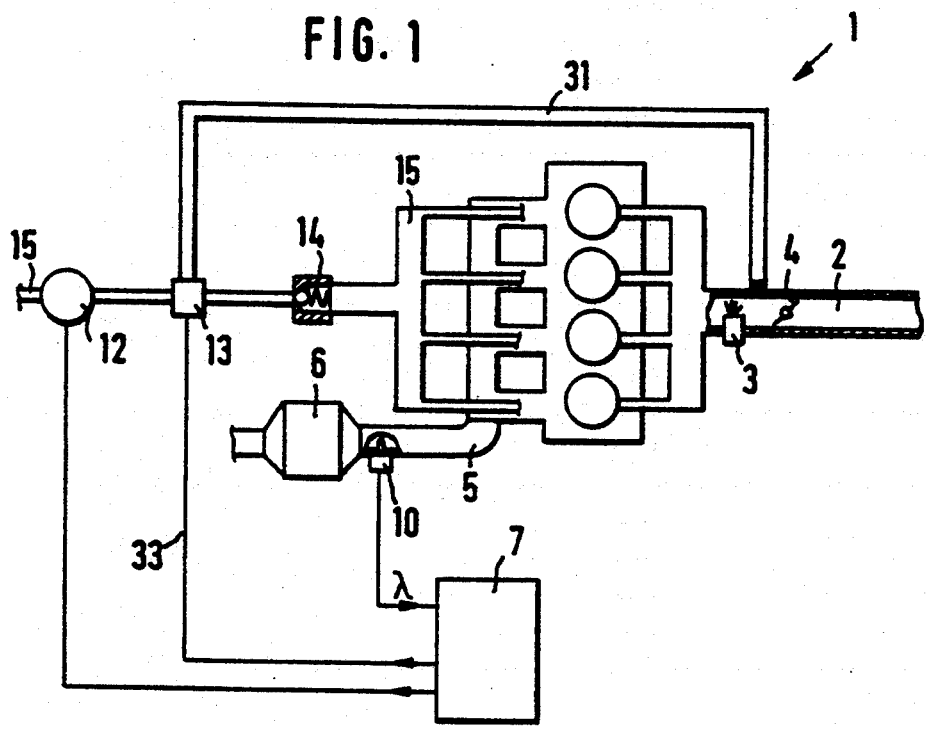
FIG. 1 shows a basic layout of a first exemplary embodiment of a system for delivering secondary air.

In the first exemplary embodiment of FIG. 1, reference numeral 1 indicates a mixture-compressing internal combustion engine with externally supplied ignition, which is supplied with a fuel-air mixture from an intake tube 2 in combination with a fuel metering device 3. The quantity of the fuel-air mixture supplied can be controlled via a throttle valve 4 disposed in the intake tube 2. The exhaust gases produced during operation of the engine 1 collect in an exhaust tube 5 and are cleaned in a catalytic converter 6. An electronic control unit 7 receives signals from a lambda sensor 10 disposed upstream of the catalytic converter 6 in the exhaust tube 5, as well as from other sensors, not shown in detail.

Via a conduit system 15, secondary air can be introduced into the exhaust tube of the engine 1 by means of a secondary air pump 12, a blocking valve 13 and a check valve 14. The secondary air pump 12 provides for pumping and pressure buildup of the secondary air. The blocking valve 13 disposed downstream of the secondary air pump serves to control the delivery of secondary air and can be opened or closed selectively. The check valve 14 disposed between the blocking valve 13 and the exhaust tube 5 has the task of preventing exhaust gas from reaching the blocking valve 13 via the conduit system 15 counter to the pumping direction of the secondary air pump. The secondary air pump 12 and the blocking valve 13 are triggerable by the control unit 7.

This kind of system for blowing in secondary air functions particularly in the warmup phase after a cold start of the engine. Typically, a slightly rich mixture is delivered to the engine then. By blowing secondary air into the exhaust gas, recombustion of uncombusted hydrocarbons takes place, for instance. The energy liberated in this chemical reaction leads to accelerated heating of the catalytic converter, so that its operating temperature is reached earlier, resulting in an additional reduction in polluting components of the exhaust gas.

To meet requirements made by law, the function of such a system for blowing secondary air into the engine exhaust should be monitored during operation. According to the invention, it is therefore proposed that for monitoring the delivery of secondary air, the secondary air pump 12 be made to run and the blocking valve 13 be normally closed. The closing pressure of the block valve 13 is adapted to a predetermined minimum secondary air pressure. If the air pressure generated by the secondary air pump 12 exceeds the closing pressure on the blocking valve 13, the blocking valve 13 opens, and the lambda sensor 10 signals the introduction of secondary air into the exhaust tube 5 by means of a change in the lambda value. The system is functioning properly whenever, during the monitoring process, a predetermined minimum air quantity is introduced into the exhaust tube 5, causing a corresponding minimum change in the lambda value. The air pressure then generated by the secondary air pump 12 corresponds to the aforementioned minimum secondary air pressure.

Figure 2:
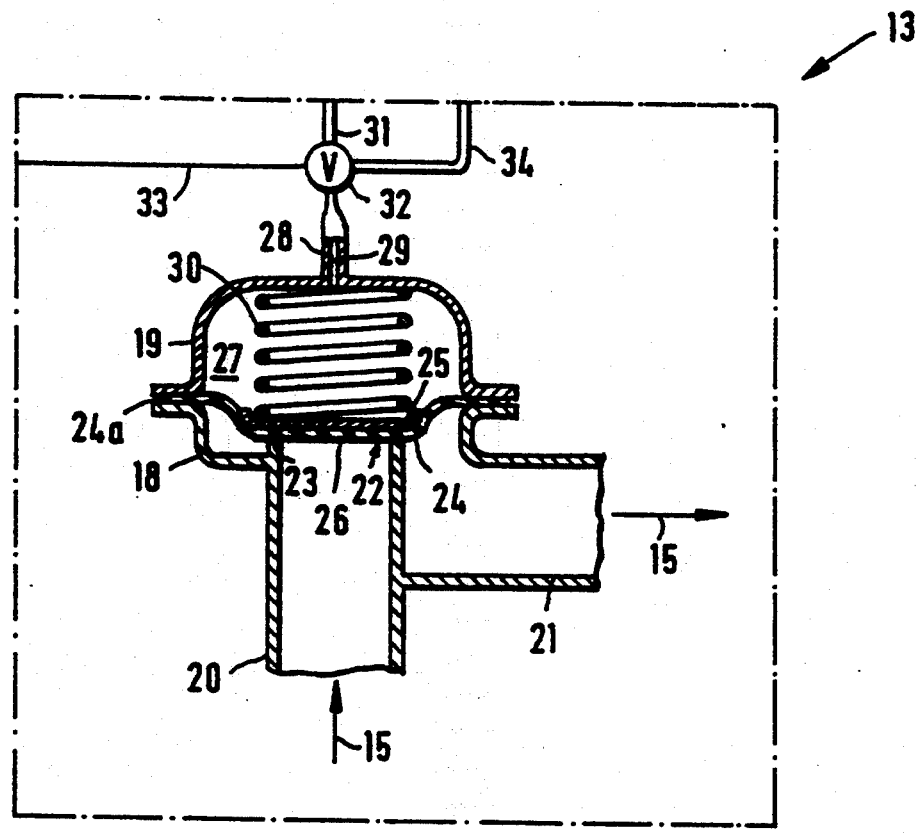
FIG. 2 is a section through a blocking valve of the exemplary embodiment of FIG. 1.

In FIG. 2, a blocking valve 13 embodied according to the invention as in the first exemplary embodiment of FIG. 1 is shown, which has a basic valve body 18 and a cup-shaped cap 19. An inlet neck 20 on the inlet side and an outlet neck 21 on the outlet side are embodied on the basic valve body 18 and serve to connect the blocking valve 13 to the conduit system 15. The inlet neck 20 communicates with the secondary air pump 12 and the outlet neck 21 communicates with the check valve 14 (FIG. 1). A flow opening 22 is formed between the inlet neck 20 and the outlet neck 21 at the mouth of the inlet neck 20 into the blocking valve 13. At the flow opening 22, the wall of the inlet neck 20 forms a valve seat 23, against which a diaphragm 24 acting as a valve closing member and having a sealing seat 26 that for instance is flat is pressed by a spring plate 25 disposed on the :Bide of the diaphragm 24 opposite the valve seat 23.

The diaphragm 24 has an encompassing edge 24a that is fixed between the basic valve body 18 and the cap 19 and that defines a valve chamber 27 formed with the cap 19. The basic valve body 18 and the cap 19 are firmly joined together via a flange, in a manner not shown in detail. A neck 28 with a connection 29 by way of which the pressure prevailing in the valve chamber 27 can be varied is formed on the cap 19. For varying the pressure, a negative pressure conduit 31 that leads to the intake tube 2 downstream of the throttle valve 4 may for instance be connected to the connection 29.

The closing pressure on the diaphragm 24 is determined by an elastic element, such as a compression spring 30, and by the pressure conditions prevailing in the blocking valve 13. The compression spring 30 is supported on one end on the spring plate 25 and on the other on the cap 19. Depending on the spring specification selected, for instance on the spring stiffness and on the prestressing travel, the closing force can be adjusted to a desired value, which is adapted to the aforementioned minimum secondary air pressure. In addition, the closing force on the diaphragm 24 can be affected by the pressure difference between the inlet neck 20 and the valve chamber 27. By introducing the external negative pressure via the negative pressure conduit 31 and the connection 29 into the valve chamber 27, the closing pressure of the diaphragm 24 is lowered, so that as a result the blocking valve 13 can be opened, or opened wider.

An electromagnetically actuatable switching valve 32 is disposed in the negative pressure conduit 31 and can be triggered by the control unit 7 by means of the electrical line 33 in such a way that during the warmup phase of the engine the valve 32 opens the negative pressure conduit 31 to the blocking valve 13 in order to permit the valve 13 to open which delivers secondary air to the exhaust tube 5. The switching valve 32 may, as shown in FIG. 1, be part of the blocking valve 13. Outside the warmup phase and during monitoring of the system, the switching valve 32 closes the negative pressure conduit 31 to the valve chamber 27 and opens a ventilating conduit 34 which leads via one end to the valve chamber 27 via connection 29 and communicates with the atmosphere via the opposite end.

According to the invention, in order to monitor the system for blowing in secondary air, the closing force on the diaphragm 24 is adapted to a minimum secondary air pressure to be built up by the secondary air pump 12, and this pressure causes a minimum air quantity that effects a corresponding change in the lambda value to be introduced into the exhaust tube 5 while the valve chamber 27 is vented with atmospheric pressure. The specification of the compression spring 30 is selected such that if the valve chamber 27 is not connected to negative pressure, a certain closing force acts upon the diaphragm 24 by means of the compression spring 30. When the blocking valve 13 is closed in this situation, the secondary air pump 12 (FIG. 1) is then switched on, whereupon the secondary air pressure in the inlet neck 20 increases accordingly. If the air pressure in the inlet neck 20 increases beyond the closing force on the diaphragm 24, then the diaphragm 24 lifts away from the valve seat 23, and via the gap then produced, secondary air can flow through the flow opening 22 into the outlet neck 21.

The secondary air flowing through the blocking valve 13 passes through the conduit system 15 via the check valve 14 into the exhaust tube 5, where it causes a change in the lambda value. If this change attains a predetermined threshold value, which is furnished by the control unit 7, this indicates that the system for blowing in secondary air is functioning correctly. The definition of the threshold value includes a minimum change in the lambda value and hence a safety margin for proving functional capability of the system.

Figure 3:
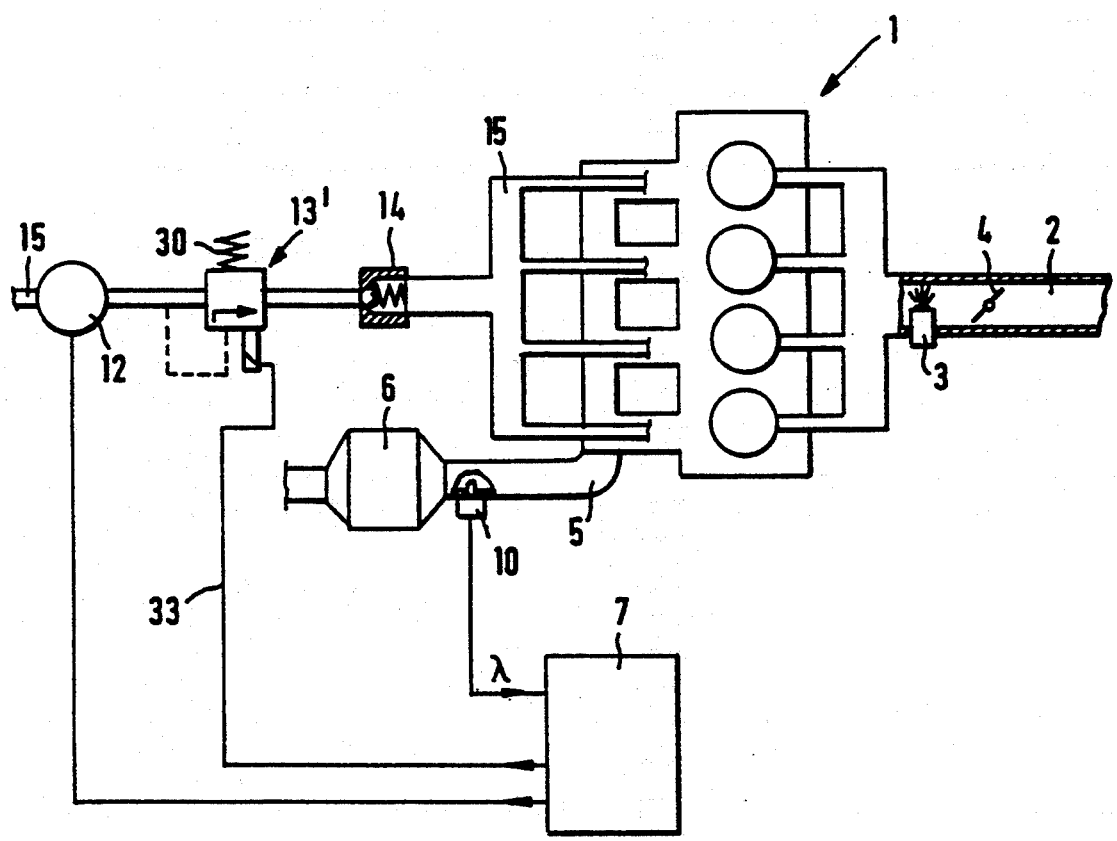
FIG. 3 shows a basic layout of a second exemplary embodiment of a system for delivering secondary air.

In the second exemplary embodiment, shown in FIG. 3, of the apparatus according to the invention for monitoring a system for delivering secondary air, those parts that remain the same and function the same as in the exemplary embodiment shown in FIG. 1 are identified by the same reference numerals.

A blocking valve 13' is now provided that has no communication with the intake tube 2 downstream of the throttle valve 4. The blocking valve 13' is embodied as an electromagnet valve and is triggered by the control unit 7 via the electric line 33 in such a way that in the engine warmup phase the valve 13' is opened, counter to the closing force of an elastic element such as a compression spring 30, until the operating temperature of the catalytic converter 6 is reached. The electromagnet valve may be triggered cyclically. As a rule, no triggering of the electromagnet valve takes place once the operating temperature of the catalytic converter 6 is reached.

The blocking valve 13' is in the form of a pressure limiting valve, in which the pressure in the conduit system 15 upstream of the blocking valve 13' is conducted to a valve closing member of the blocking valve 13' in such a way that it counteracts the force of the elastic element. If the secondary air pump 12 is now put into operation in order to monitor the system, preferably during engine idling with the electromagnet valve not triggered, then the pressure force acting upon the valve closing member and generated by the secondary air pump 12 overcomes the closing force of the elastic element and causes opening of the blocking valve 13'. If the air quantity flowing via the now-opened blocking valve 13' reaches the aforementioned minimum air quantity, the result is that the lambda threshold value is exceeded, and this is detected by the lambda sensor, thereby proving that the system is functioning properly.

Since the apparatus does not blow secondary air into the exhaust gas is not blown in until the secondary air pressure in the inlet neck 20 overcomes the closing force of the blocking valve 13, 13' only a relatively small quantity of secondary air is delivered to the exhaust gas during function monitoring. In this way, it is possible for major pumping capacities of the secondary air pump, which are characterized by the pumping pressure and the pumping volume, to be monitored with only a relatively small quantity of secondary air reaching the exhaust gas, thereby averting unfavorable influence on the exhaust composition, since monitoring of the system for delivering secondary air is as a rule done during engine idling.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for monitoring a system for delivering secondary air to an exhaust tube of an internal combustion engine, having a secondary air pump that furnishes secondary air, a triggerable blocking valve that has a valve closing member engaged in a closing direction by a closing force, said closing force closes the blocking valve if the blocking valve is in a nonexcited state, a lambda sensor disposed in the exhaust tube, the closing force of the blocking valve (13, 13') is selected such that with the blocking valve (13, 13') not triggered, and with an adequately large minimum air quantity pumped by the secondary air pump (12), the blocking valve (13, 13') is automatically opened, and a change in a lambda value of the lambda sensor that exceeds a predetermined threshold value is detected by the lambda sensor (10).

2. An apparatus as defined by claim 1, in which the closing force on the blocking valve (13, 13') is effected by an elastic element (30).

3. An apparatus as defined by claim 2, in which the blocking valve (13) has a valve closing member in the form of a diaphragm (24), which is acted upon in a closing direction by the elastic element (30), and the elastic element (30) is disposed in a valve chamber (27) defined by the diaphragm (24), which valve chamber communicates via a negative pressure conduit (31) with an intake tube (5) of the engine downstream of a throttle valve (4), and the negative pressure conduit (31) connected to the chamber (27) can be interrupted by means of a switching valve (32), and a ventilating line (34) to the valve chamber (27) can be opened to an atmospheric pressure.

4. An apparatus as defined by claim 2, in which the blocking valve (13') can be opened counter to the closing force of the elastic element (30) electromagnetically.

5. An apparatus as defined by claim 2, in which the blocking valve (13') can be opened counter to the closing force of the elastic element (30) by the pressure of the secondary air pumped by the secondary air pump (12).

* * * * *

UNITED STATES PATENT AND TRADEMARK OFFICE
CERTIFICATE OF CORRECTION

PATENT NO. : 5,406,788

DATED : April 18, 1995

INVENTOR(S) : Dieter-Andreas Dambach et al

It is certified that error appears in the above-identified patent and that said Letters Patent is hereby corrected as shown below:

ON THE TITLE PAGE

--[54] APPARATUS FOR MONITORING A SYSTEM FOR DELIVERING SECONDARY AIR TO THE EXHAUST GAS OF AN INTERNAL COMBUSTION ENGINE--

In the Abstract:

Line 3, delete "method and"

Signed and Sealed this

Fourth Day of July, 1995

Attest:

BRUCE LEHMAN

*Attesting Officer*     *Commissioner of Patents and Trademarks*